United States Patent [19]
Dove, Jr. et al.

[11] 3,890,010
[45] June 17, 1975

[54] FLOTATION/TIRE/ASSEMBLY

[75] Inventors: Curtis N. Dove, Jr., Bastrop; Jimmie George, Merrouge, both of La.

[73] Assignee: Flotation Trailer Trac, Inc., Bastrop, La.

[22] Filed: Apr. 12, 1973

[21] Appl. No.: 350,506

[52] U.S. Cl. .............. 301/52; 301/41 R; 301/40 S
[51] Int. Cl. ............................................. B60b 15/26
[58] Field of Search ........... 301/36 R, 13 SM, 13 R, 301/40 S, 40 R, 39 R, 39 T, 10 R, 11 R, 11 CD, 9 DN, 9 TV, 52; 152/152, 220, 376; 180/9.36

[56] References Cited
UNITED STATES PATENTS
2,751,959   6/1956   Blomquist.......................... 301/9 TV
3,750,778   8/1973   Watson.............................. 180/9.36

*Primary Examiner*—M. Henson Wood, Jr.
*Assistant Examiner*—Reinhard J. Eisenzopf
*Attorney, Agent, or Firm*—John M. Harrison

[57] ABSTRACT

A single or dual tire assembly consisting of at least one low pressure, flotation tire adapted for installation on the hub and drum assembly of a mobile home or similar vehicle to enable transportation of the vehicle over boggy terrain. In one embodiment the assembly consists of a flotation tire and conventional tire of smaller diameter mounted on a common hub, the hub being adapted for attachment to a mobile home hub and drum assembly by means of a hub assembly using conventional lugs and bolts.

2 Claims, 4 Drawing Figures

PATENTED JUN 17 1975 3,890,010
SHEET 1

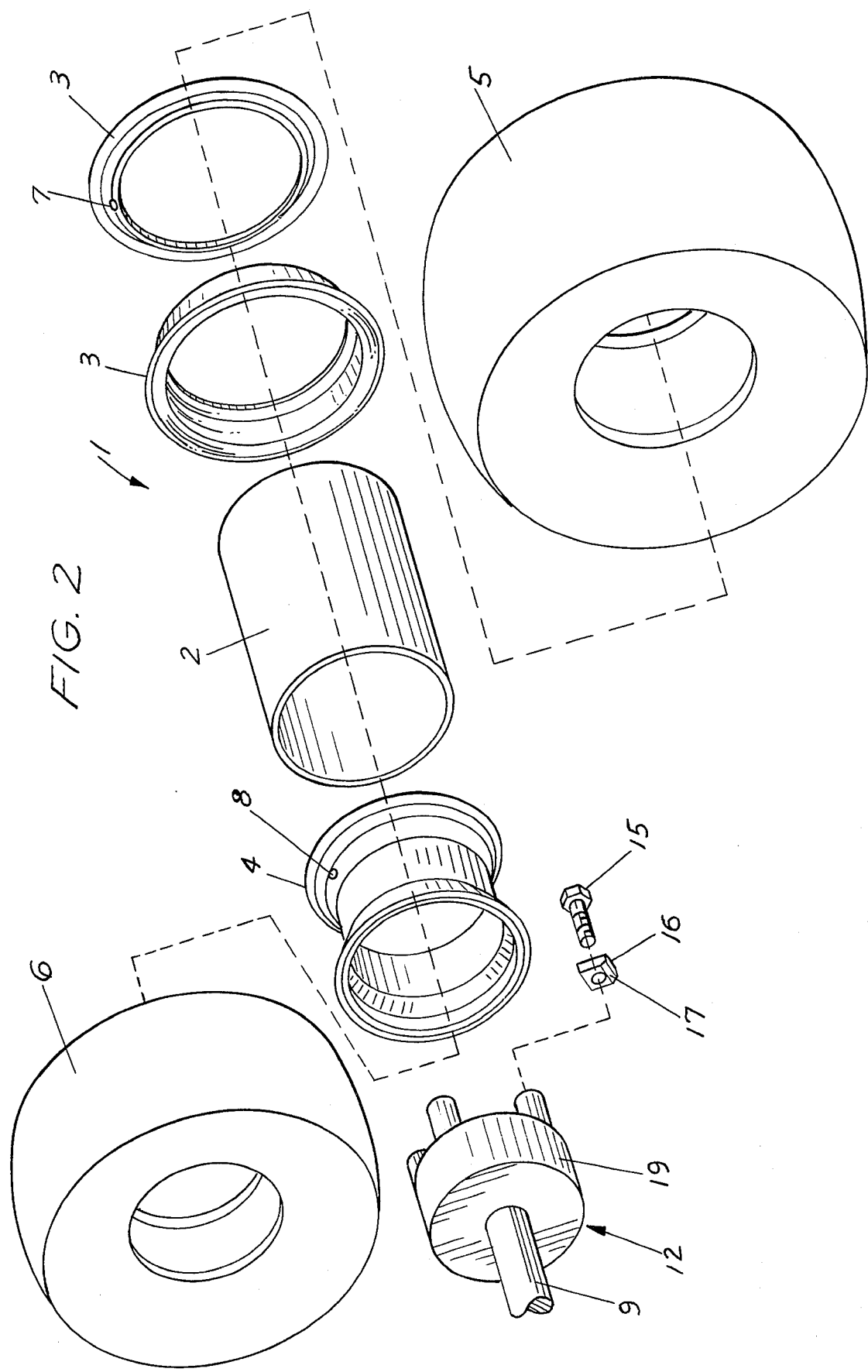

FLOTATION/TIRE/ASSEMBLY

BACKGROUND OF THE INVENTION

1. Field of the Invention

This invention relates to the transportation of heavy vehicles such as mobile homes across boggy terrain, and particularly, to a flotation tire assembly which may be attached to the hub and drum assembly of such vehicles to keep the tires from sinking in the boggy ground. The tire assembly consists of a large, low pressure flotation tire, preferably in combination with a conventional tire of smaller diameter and carrying a somewhat higher pressure, both of which are mounted on a common hub and rim assembly which may be bolted to the hub and drum assembly of the mobile home by means of a conventional hub assembly. The term "flotation" is used in this application to indicate the stabilizing effect of placing a tire or tires having a large ground contact area on a vehicle to facilitate movement of or to "float" the vehicle across boggy terrain. The flotation tire assembly of this invention can be quickly and easily mounted on the mobile home in the event it bogs in soft terrain, or the device can be utilized in anticipation of bogging when it is desired to traverse such terrain. Upon crossing such terrain, and after reaching the desired destination, the assembly can be easily removed by jacking the vehicle and removing the lugs and bolts from the hub and drum assembly.

2. Description of the Prior Art

Heretofore, remedies for freeing bogged mobile homes and other similar vehicles, both at the sales location and after being sold, were limited to use of tractors or winch trucks to free the vehicles. Frequently, these tractors, winch trucks, as well as mats to prevent excessive bogging, must be rented, or at least borrowed, thereby presenting an expense or at best, an inconvenience, to the mobile home dealer or owner. The problem of mired mobile homes is, of course, minimized by placing these mats on the ground or paving the supporting area, but both remedies are costly, and if blocks are utilized, the blocks must, of course, be removed prior to relocation of the mobile home.

Generally, mobile home sales outlets prefer to lease a parcel of land, usually cleared but unimproved, for use as a mobile home parking area to display the homes. Heavy rains frequently turn such areas into quagmires, thereby causing the vehicles to stick and frequently necessitating the use of tractors or winch trucks to free them. This problem of bogging is generally intensified due to a concentration of weight in the average mobile home on the relatively small tire area. Accordingly, once mired in soft mud, the vehicle cannot usually be freed by use of conventional mobile home tractors, and must be pulled from the mud by heavier vehicles such as heavy-duty tractors or winch trucks.

Furthermore, the problem of sticking the mobile home at its final or temporary destination after it has been leased or sold is frequently intensified by inability of the dealer or owner to locate a tractor or winch truck of sufficient size which is capable of freeing the bogged vehicle.

Still another problem inherent in freeing mired mobile homes is that of causing frame or body damage, or pulling the wheels away from the frame when the tractor or winch truck attempts to pull the vehicle out of the mud. Once the frame or body is warped by such action, further transportation may be impossible or difficult, and if the mobile home is new when so damaged, its salability is, of course, adversely affected.

Accordingly, it is an object of this invention to provide a device adapted for removable attachment to mobile homes and other similar vehicles which will prevent the vehicles from sinking and becoming mired in boggy terrain.

Another object of the invention is to provide an assembly for attachment to mired mobile homes and other vehicles to enable quick and easy extraction of such vehicles from mud or other boggy terrain.

Yet another object of the invention is to provide a flotation tire assembly which is adapted for mounting on the hub and drum assembly of a mobile home or similar vehicle to provide more contact area between the vehicle and the boggy ground to enable the vehicle to be freed by use of a conventional tractor or truck.

A still further object of this invention is to provide a flotation tire assembly for mounting on the hub and drum assembly of a mobile home, which flotation tire assembly is equipped with a relatively large, low pressure flotation tire to provide maximum tire surface in contact with the boggy terrain for easy removal of a mired vehicle, or to prevent sticking of such vehicle when traversing such unstable ground.

Another object of this invention is to provide a flotation tire assembly for mounting on the hub and drum assembly of a mobile home after removal of the vehicle tires, which flotation tire assembly consists of a relatively large, low pressure flotation tire and a conventional mobile home tire on a common, cylindrically shaped hub and rim combination.

SUMMARY OF THE INVENTION

These and other embodiments of the invention are provided in a flotation tire assembly having the following elements:

1. A hub, essentially cylindrical in shape.
2. At least one low pressure tire carried by the hub.
3. A conventional hub assembly for connecting the hub and tire to the hub and drum assembly of a mobile home.

BRIEF DESCRIPTION OF THE DRAWINGS

The invention will be better understood in view of the following description presented with reference to the accompanying drawings:

FIG. 2 is an exploded view of the flotation tire assembly illustrated in FIG. 1;

DESCRIPTION OF THE PREFERRED EMBODIMENTS

Figure 1:
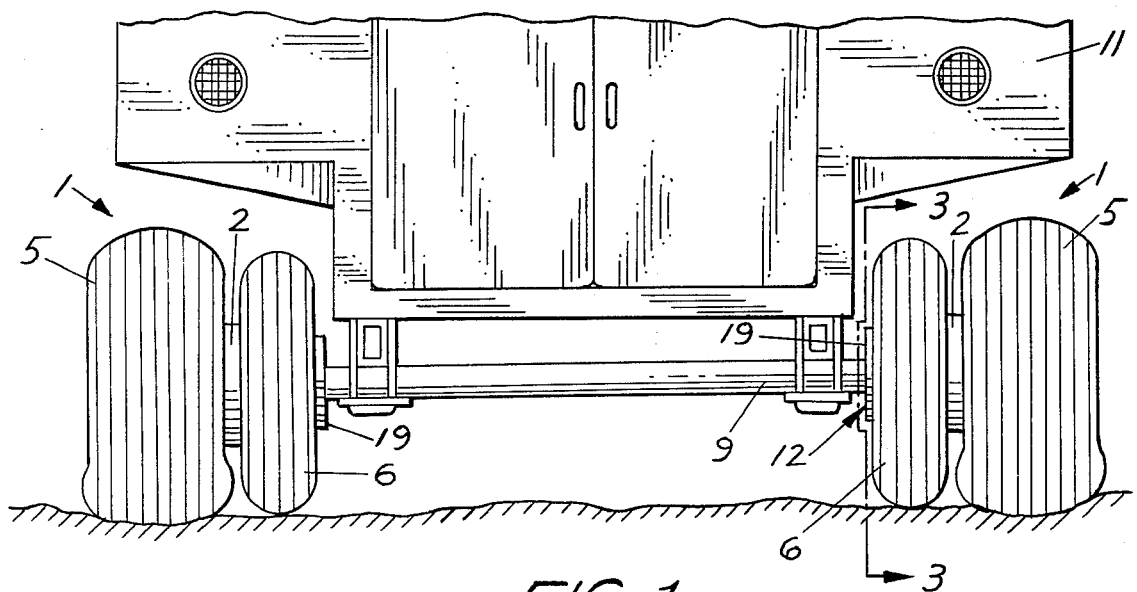
FIG. 1 of the drawings is a rear elevation of a typical mobile home illustrating a preferred flotation tire assembly of the invention installed thereon.

Referring now to FIG. 1 of the drawings, the rear portion 11 of a conventional mobile home or similar vehicle is illustrated, with flotation tire assembly generally illustrated by reference numeral 1 installed on hub and drum assembly 9 via conventional hub assembly 12. Flotation tire assembly 1 as illustrated in FIG. 1 comprises hub 2, carrying flotation tire 5 and stabilizing tire 6.

FIG. 2 discloses the flotation tire assembly generally indicated by reference numeral 1 in exploded form, with hub 2 designed to carry flotation tire rims 3 and stabilizing tire rim 4. Flotation tire rims 3 and stabilizing tire rim 4 are equipped with flotation tire rim aperture 7 and stabilizing tire rim aperture 8, to accommodate the tire valve stems, as hereinafter provided. Flotation tire rims 3 and stabilizing tire rim 4 are adapted to carry flotation tire 5 and stabilizing tire 6, respectively, in essentially parallel relationship on hub 2. Conventional hub assembly generally illustrated by reference numeral 12 (more particularly described in FIG. 4) may be designed as set forth in U.S. Pat. No. 200,102, or a similar design may be utilized, as desired. The hub assembly is adapted to cooperate by means of lugs 16 and lug bolts 15 with hub and drum assembly 9 of the mobile home, and stabilizing tire rim 4, to releasably secure hub assembly 12 onto hub and drum assembly 9. Conventional hub assembly body 19 is fitted with lug seats and threaded lug bolt apertures (more particularly illustrated in FIG. 4) for mating with lugs 16 and bolts 15 in the mounting operation.

Figure 3:
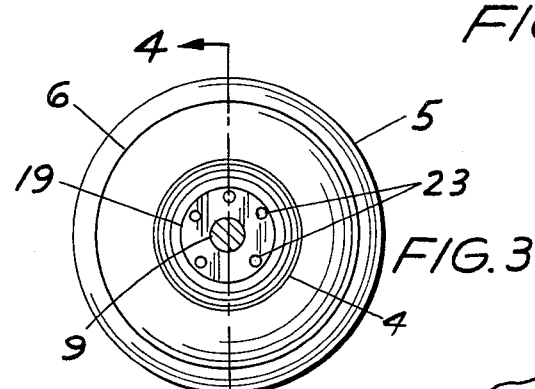
FIG. 3 is an end view along section lines 3—3 of the flotation tire assembly illustrated in FIG. 1, showing a conventional hub assembly attached to the mobile home hub and drum assembly.

Referring now to FIG. 3 of the drawing, a sectional end view of flotation tire assembly 1 is shown, with conventional hub assembly body 19 secured to hub and drum assembly 9 by the action of threaded lug bolt apertures 23, and stabilizing tire rim 4 releasably secured to hub assembly body 19 by means of lugs 16 and bolts 15 (not illustrated). As illustrated in FIGS. 1 and 3, flotation tire 5 may be, and generally is, larger in diameter and wider than stabilizing tire 6, as will be discussed in more detail hereinafter.

Figure 4:
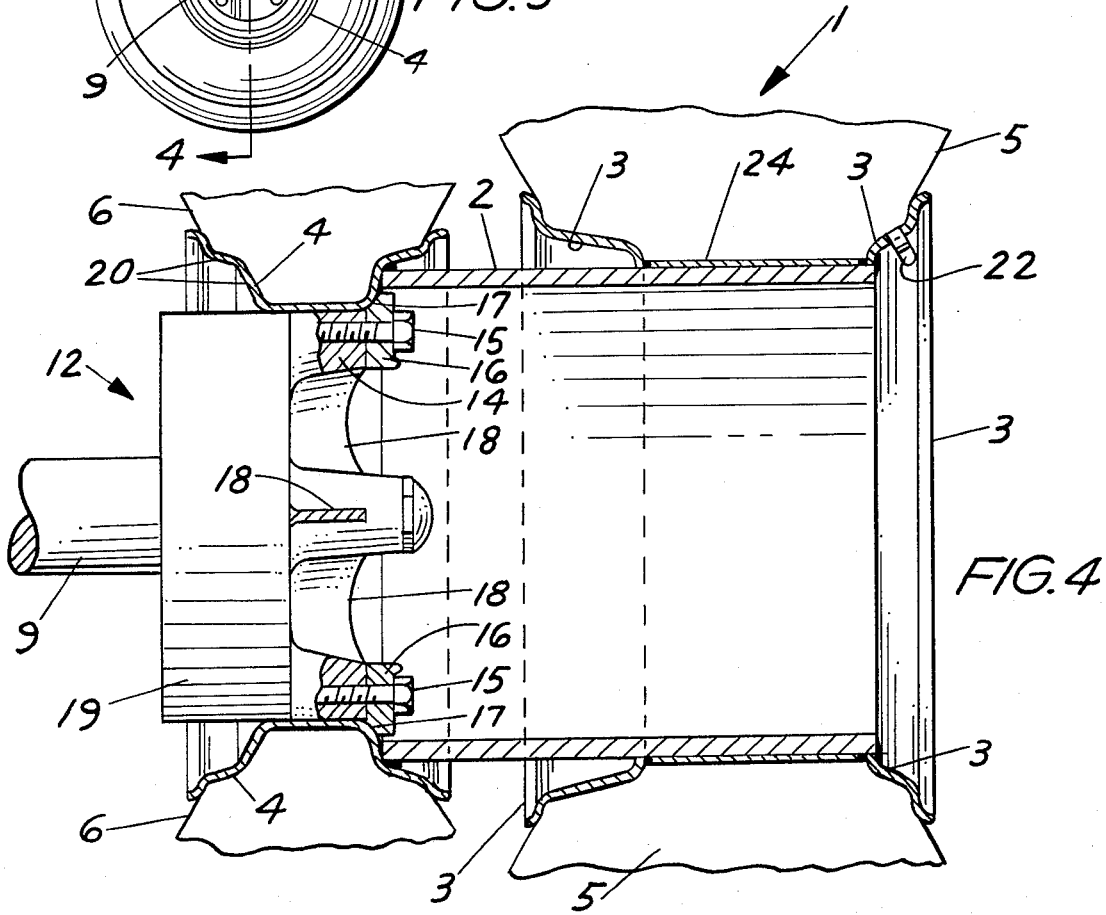
FIG. 4 is a sectional view of the flotation tire assembly illustrated in FIGS. 1–3, along section lines 4—4 in FIG. 3.

FIG. 4 of the drawings more particularly illustrates the inventive flotation tire assembly mounted on the mobile home hub and drum assembly by means of a conventional hub assembly, and specifically shows the mechanical cooperation between the flotation tire assembly and the hub assembly. It will be appreciated that hub 2 preferably forms the web 24, of flotation tire rims 3, which may be welded to hub 2; furthermore, web 24 may be as wide as is necessary to accommodate a flotation tire 5 of sufficient size. It will be further appreciated that rims 3 may be cut from conventional tire rims and welded onto hub 2 with such spacing as is desired between flotation tire rims 3, or the rims may be utilized with the conventional web, as in the case of stabilizing tire rim 4. In the latter case, hub 2 will generally be shortened to reduce the space between flotation tire 5 and stabilizing tire 6. In order to effect a tight seal between flotation tire 5, web 24 and flotation rims 3, and to avoid excessive tube wear, it is also preferable to wrap tape around web 24, under preferred circumstances indicated above where hub 2 also serves to function as web 24.

As illustrated in FIG. 4 of the drawings, stabilizing tire rim 4 is preferably welded to hub 2 at a sufficient distance from flotation tire rims 3 to prevent contact between flotation tire 5 and stabilizing tire 6. Conventional hub assembly 12 is adapted to mate with stabilizing rim 4 by means of matching hub assembly shoulder 20 formed on hub assembly body 19. Accordingly, in order to mount conventional hub assembly 12 on stabilizing tire rim 4, hub assembly shoulder 20 is fitted to the outside of stabilizing tire rim 4, and lugs 16 placed into position in lug seats 14 with bevel 17 securely against the inside of stabilizing tire rim 4. Lug bolts 15 are then fitted through registering holes in lugs 16 and threaded tightly into lug bolt apertures 23 to secure conventional hub assembly 12 onto stabilizing tire rim 4.

It will be appreciated by those skilled in the art that flotation tires of varying sizes and containing varying air pressure may be utilized in the invention, depending upon the weight of the mobile home or similar vehicle, and the terrain upon which the vehicle is placed or which must be traversed. Generally, for conventional mobile home application, it is preferred to use a flotation tire of substantially any design which presents a relatively large ground contact area, and which contains from about 12 to about 26 pounds per square inch guage of air pressure; most preferably, the tire should contain from about 12 to about 18 pounds of air pressure. As a general rule, it is preferred to use the lowest tire pressure which is feasible, considering tire design, to provide maximum flotation in boggy terrain. For example, as illustrated in FIG. 1, flotation tire 5 is elongated at the point of contact with the ground, and the degree of elongation depends upon the tire pressure and vehicle weight. Accordingly, it is preferred to achieve maximum elongation consistent with tire stability in order to achieve maximum tire surface-to-ground contact.

Although it is further preferred to utilize a flotation tire and stabilizing tire combination to put less strain on the hub assembly and vehicle hub and drum assembly when the mobile home is traversing semi-boggy or hard terrain, a single or double flotation tire assembly may be utilized in extremely boggy terrain where such stabilization of the assembly is not required. Similarly, depending upon the weight of the vehicle and depth of mud to be traversed, additional flotation tires can be mounted on each side of the mobile home on all of the vehicle hub and drum assemblies, if necessary, to provide the desired flotation. Such additional flotation frequently becomes necessary in areas such as the deep south and Gulf Coast states which experience seasonal flooding due to hurricane activity and heavy spring rains.

It will be recognized that while the invention has been described with reference to the conventional hub assembly described herein and illustrated in the drawings, substantially any apparatus and means known to those skilled in the art can be utilized to mount the flotation tire assembly of this invention onto the vehicle hub and drum assembly. In this regard, although the invention has been disclosed with a certain degree of particularity, it is understood that the present disclosure has been made only by way of example and that numerous changes in the details of construction and the combination and arrangements of parts may be achieved without departing from the spirit and scope of the invention.

We claim:

1. A flotation tire assembly for removable mounting on the hub and drum assembly of a vehicle comprising:
   a. An essentially cylindrically shaped hub of fixed length;
   b. A flotation tire rim mounted on said hub;
   c. A substantially low pressure flotation tire mounted on said flotation tire rim;

d. A stabilizing tire rim mounted on said hub in essentially parallel relationship to said flotation tire rim;

e. A substantially high pressure stabilizing tire having a smaller diameter then said flotation tire mounted on said stabilizing tire rim; and f. A hub assembly in cooperation with said stabilizing tire rim for releasably securing said flotation tire assembly to said hub and drum assembly.

2. The flotation tire assembly of claim 1 wherein said flotation tire carries an air pressure of from about 12 to about 18 pounds per square inch guage.

* * * * *